(No Model.)

H. R. TILLISON.
LOOSE PULLEY.

No. 496,919.          Patented May 9, 1893.

Attest:
Howell Bartle
Alex Scott

Inventor:
Hosea R. Tillison
By Philip F. Larner
Associate Attorney

UNITED STATES PATENT OFFICE.

HOSEA R. TILLISON, OF BOSTON, MASSACHUSETTS, ASSIGNOR TO THE S. A. WOODS MACHINE COMPANY, OF SAME PLACE.

LOOSE PULLEY.

SPECIFICATION forming part of Letters Patent No. 496,919, dated May 9, 1893.

Application filed April 8, 1890. Serial No. 347,145. (No model.)

*To all whom it may concern:*

Be it known that I, HOSEA R. TILLISON, of Boston, in the county of Suffolk and State of Massachusetts, have invented a new and useful Improvement in Loose Pulleys, of which the following is a specification.

My invention relates to what are known as loose or idler pulleys, on which the belt is run off, when the machine to which they are attached is stopped for any purpose, and it consists in certain new and useful constructions and combinations of the several parts of the same, substantially as hereinafter described and claimed.

This invention is an improvement upon the loose pulley patented to James A. Horton, March 10, 1885, No. 313,497.

Figure 1:
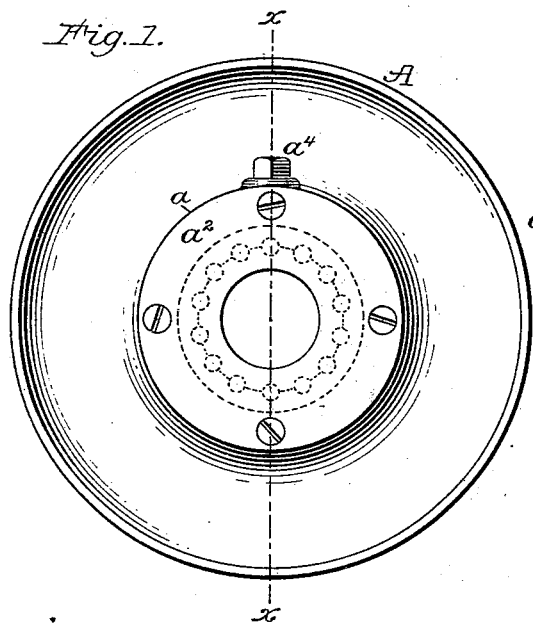
Figure 2:
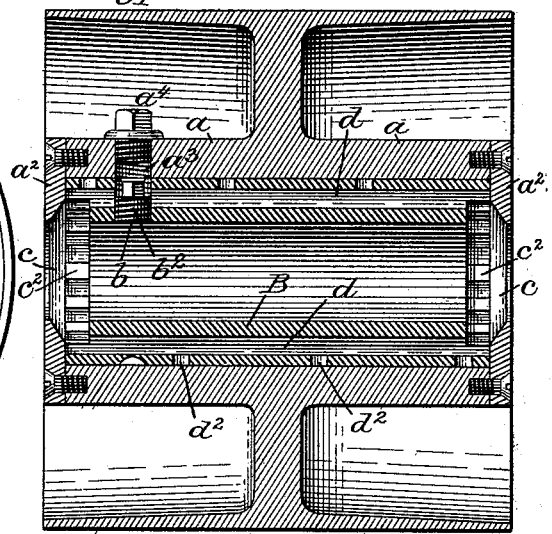
Figure 7:
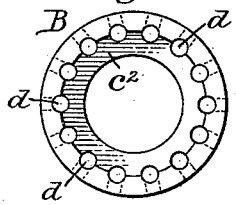
Figure 5:
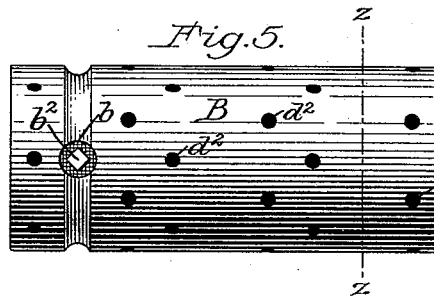
Figure 6:
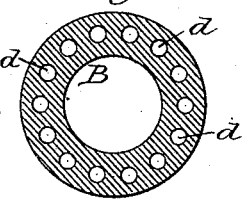
Figure 4:
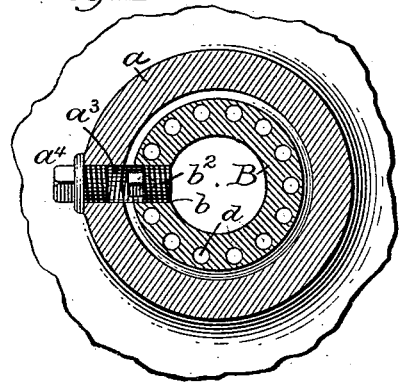
Figure 3:
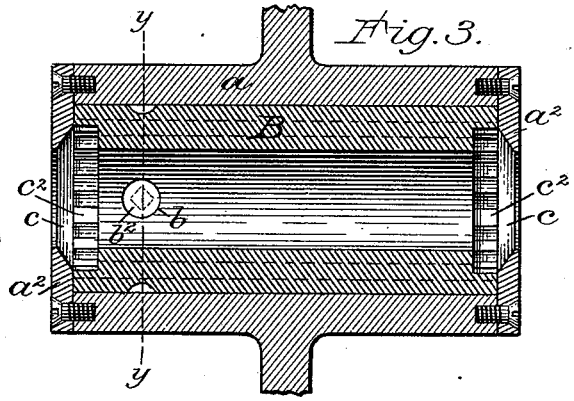

In the drawings: Figure 1 is an end view of a loose pulley constructed according to my invention. Fig. 2 is a section through its axis on the dotted line $x$—$x$. Fig. 3 is a section of its central portion through its axis at right angles to Fig. 2. Fig. 4 is a transverse section of its central part, on the line $y$—$y$ of Fig. 3. Fig. 5 is a side view of the sleeve removed from the pulley. Fig. 6 is a transverse section of the same on the line $z$—$z$. Fig. 7 is an end view of the same.

A is the rim, and $a$ the outer shell of the pulley, which surrounds the shaft. This shell has a cylindrical bore, on which the pulley runs on the sleeve B, which is attached to the shaft and practically forms an enlargement of it between pulley flanges $a^2$, $a^2$. This is contained between two heads or flanges $a^2$, $a^2$, which are screwed on to the tubular shell, $a$, of the pulley at each end and keep the pulley in place on the sleeve, when the latter is secured to the shaft, as well as retain the oil in the pulley when it is in use. As these pulleys have to be made in the machine shop and shipped to the owners of the shafts who are to apply them in distant parts of the country, it becomes important that the customer purchasing them should be able to apply them to the shafts without getting them out of order, and that they shall be constructed so that no oil can escape. The principle on which they work is, that the oil shall be held in a reservoir or reservoirs in the sleeve B, outside of the hole through its center which receives the shaft, and outside of the corresponding holes through the heads or flanges $a^2$, $a^2$, which pass over the shaft, and secondly, that the bearing on which the pulley revolves on the shaft shall be outside of the reservoir or reservoirs in the sleeve B. This construction causes the oil to be pressed outward by the centrifugal force into the bearing of the bore of shell, $a$, as the pulley runs, and to keep it thoroughly lubricated. When the pulley stands still, however, the oil all runs down into the lowermost part of the reservoir or reservoirs, and is held there by the heads or flanges $a^2$, $a^2$, until the pulley starts again. As the pulley is usually started up quite quickly it then becomes necessary to have a sufficient means of exit within the pulley, for the oil, which is thus thrown or carried out by centrifugal force, especially near the heads $a^2$, $a^2$, to enable it to flow around into the other receptacles, or parts of one, if there be but one, and distribute itself rapidly around the pulley bearing without being thrown out from the pulley. It is also important to keep the bearing surface of the sleeve B as perfect as possible for the pulley to run on, and to keep the joints between the heads $a^2$, $a^2$, and the shell, $a$, oil-tight so as to prevent the escape of the oil. To accomplish these results as well as to enable the purchaser to apply the pulley, is the object of the present improvement. I provide an oil hole, $a^3$, in the shell $a$, which is closed by the screw plug $a^4$. Opposite to this oil hole I drill a radial hole, $b$, through the sleeve B, into which I screw a set screw $b^2$, having a squared head on its outer end fitted to receive a wrench, which can be made in the form of a key, such as is commonly used to wind a clock or watch, so as to be inserted through the hole $a^3$ in shell $a$. The squared head of the set screw, $b^2$, is of course smaller than this hole.

In order to prevent the oil from being thrown out of the pulley, or of flowing out of it by capillary attraction between the contiguous surfaces of the shaft and the heads $a^2$, $a^2$, I turn out these heads tapering on their inner faces so as to make a very narrow surface to the hole, through which the shaft passes, and leave a chamber, $c$, around the latter, through which the oil may flow from one reservoir, $d$, to another in the sleeve B. To further enlarge this chamber $c$, a circular countersink or groove, $c^2$, is turned around the bore of the sleeve, and inside of the outermost side of the oil reservoirs $d$, measuring from the shaft center. The annular chambers $c$, $c$, at the ends of the sleeve B and inside the heads $a^2$, $a^2$, thus lie entirely within the outer circumference of the oil chambers $d$, which allows the centrifugal force to properly distribute the oil, when the pulley is started up from a state of rest, without its escaping. The oil would not flow inward toward the center of the shaft and, therefore, if the annular chamber $c$ were outside of the chambers $d$, $d$, the oil in it would stay there and could neither flow, nor allow any other oil to flow into chambers $d$. The chambers or reservoirs $d$, $d$, are made by boring holes in the sleeve B around and parallel to the shaft. As these chambers and the sleeve B are quite long, small holes, $d^2$, are bored radially outward from them to the surface of the sleeve, to supply oil to the running bearing of the pulley near its center.

By the construction described the running bearing of the pulley upon the sleeve B lies outside of the oil chambers $d$, $d$, not only around the circumference but at the ends of the sleeve, where the end thrust of the pulley produces the most heating, thus enabling these surfaces to be supplied with oil by centrifugal force constantly while the pulley is running.

The advantage of the set screw, $b^2$, arranged as described is, that it enables the purchaser of the pulley to attach it to the shaft by removing the screw plug, $a^4$, and turning the pulley on the shaft extension until the nose of the wrench engages with the head of the set screw $b^2$. The pulley can also be shifted on the shaft in the same way. The purchaser of the pulley does not, therefore, have to remove one of the end heads or flanges $a^2$, $a^2$, to attach or remove the pulley from the shaft, which is not only troublesome but difficult to do and replace so that it fits against the shell, $a$, of the pulley oil tight. It may be found advantageous to sweat the surfaces together between the head $a^2$ and the shell $a$ in some cases, to insure the oil-tight joint where light mineral oil is used, and in this case the only way to secure the shaft extension to the shaft is through the oil hole, $a^3$, as described.

The holes $d^2$, $d^2$, do not present any cutting edges extending lengthwise of the sleeve B, to cut the pulley bearing out in case one part of the sleeve surface should be softer and wear down faster than another, as might happen if the chambers $d$, $d$, extended entirely through to the surface of the sleeve. If the sleeve B comes in contact with the end heads $a^2$, $a^2$, at its ends immediately around the shaft, it is found that these surfaces being so near together when the pulley is stopped, cause the oil to continually work out between them by capillary attraction and thence along the shaft, which is annoying and wasteful.

What I claim as new and of my invention is—

1. The combination, in a loose pulley, of the sleeve, B, arranged to be attached to the shaft and to revolve with it, the pulley taking its bearing around the periphery of the same and having end heads projecting inward and bearing upon its ends, the oil chambers $d$, $d$, located in the sleeve and opening at each end on their outermost sides into the annular chamber, $c$, with the latter located and extending peripherally around the shaft inside of the end bearings of the pulley, whereby the centrifugal force created by the rotation of the shaft will drive the oil out of the chambers $d$, $d$, into chamber, $c$, and thence outward on to the end pulley bearings, substantially as described.

2. The combination, in a loose pulley, of the sleeve B arranged to be attached to the shaft, the oil chambers $d$, $d$, located therein, the radial holes $d^2$, $d^2$, extending to its outer surface, the pulley taking its bearing around the exterior thereof, the end heads $a^2$, $a^2$, inclosing the ends of said sleeve, and the annular end chambers $c$, $c$, substantially as described.

HOSEA R. TILLISON.

Witnesses:
N. P. OCKINGTON,
DAVID HALL RICE.